United States Patent
Murata et al.

(10) Patent No.: US 9,112,249 B2
(45) Date of Patent: Aug. 18, 2015

(54) POWER SOURCE APPARATUS HAVING COOLING PATH AND GAS DISCHARGE PATH

(75) Inventors: Takashi Murata, Kasugai (JP); Kenji Kimura, Miyoshi (JP); Nobuyoshi Fujiwara, Toyota (JP); Kousuke Kusaba, Inazawa (JP); Kazuhiro Gotou, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/512,483

(22) PCT Filed: Apr. 26, 2011

(86) PCT No.: PCT/JP2011/002457
§ 371 (c)(1),
(2), (4) Date: May 29, 2012

(87) PCT Pub. No.: WO2012/147126
PCT Pub. Date: Nov. 1, 2012

(65) Prior Publication Data
US 2014/0038020 A1    Feb. 6, 2014

(51) Int. Cl.
| H01M 10/50 | (2006.01) |
| H01M 10/6555 | (2014.01) |
| H01M 2/10 | (2006.01) |
| H01M 10/625 | (2014.01) |
| H01M 10/643 | (2014.01) |
| H01M 10/6554 | (2014.01) |
| H01M 10/617 | (2014.01) |
| H01M 10/613 | (2014.01) |
| H01M 10/656 | (2014.01) |

(52) U.S. Cl.
CPC .......... *H01M 10/5055* (2013.01); *H01M 2/105* (2013.01); *H01M 10/5016* (2013.01); *H01M 10/613* (2015.04); *H01M 10/617* (2015.04); *H01M 10/625* (2015.04); *H01M 10/643* (2015.04); *H01M 10/656* (2015.04); *H01M 10/6554* (2015.04); *H01M 10/6555* (2015.04)

(58) Field of Classification Search
CPC .................... H01M 10/5055; H01M 10/5016
USPC .................................... 429/53, 120
See application file for complete search history.

(56) References Cited

U.S. PATENT DOCUMENTS

| 2003/0031921 | A1 | 2/2003 | Nakanishi et al. |
| 2010/0009244 | A1* | 1/2010 | Murata ........................... 429/53 |
| 2011/0104547 | A1* | 5/2011 | Saito et al. .................... 429/120 |

FOREIGN PATENT DOCUMENTS

| CN | 101609874 A | 12/2009 |
| GB | 2460946 A | 12/2009 |

(Continued)

OTHER PUBLICATIONS

International Search Report issued in International Application No. PCT/JP2011-002457 dated Aug. 2, 2011 (with translation).

*Primary Examiner* — Ula C Ruddock
*Assistant Examiner* — Frank Chernow
(74) *Attorney, Agent, or Firm* — Oliff PLC

(57) ABSTRACT

A power source apparatus having an assembled battery including a plurality of batteries of cylindrical shape arranged in a diameter direction of the battery within a case includes a holding member which holds the plurality of batteries from the diameter direction and is in contact with the inner face of the case to divide the internal space of the case into a cooling path in which a coolant flows and a gas discharge path in which gas is discharged from the battery in a battery abnormality, wherein the holding member is a solid plate member conducting heat of the battery.

6 Claims, 7 Drawing Sheets

(56) References Cited

FOREIGN PATENT DOCUMENTS

| | | |
|---|---|---|
| JP | A-08-255637 | 10/1996 |
| JP | A-10-255735 | 9/1998 |
| JP | A-2000-021456 | 1/2000 |
| JP | A-2000-067825 | 3/2000 |
| JP | A-2004-014421 | 1/2004 |
| JP | A-2006-318820 | 11/2006 |
| JP | A-2009-117264 | 5/2009 |
| JP | A-2010-192209 | 9/2010 |
| WO | WO 2010/019764 * 2/2010 .............. H01M 2/10 |

* cited by examiner

POWER SOURCE APPARATUS HAVING COOLING PATH AND GAS DISCHARGE PATH

TECHNICAL FIELD

The present invention relates to a power storage apparatus having an assembled battery including a plurality of batteries of cylindrical shape connected to each other.

BACKGROUND ART

An assembled battery including a plurality of batteries connected to each other is used as a driving or auxiliary power source of an electric car and a hybrid car. Since the battery is deteriorated due to a temperature rise, the battery needs to be cooled by flowing a coolant through a cooling path formed between the adjacent batteries. The battery is provided with a gas discharge valve for discharging gas produced in a battery abnormality such as overcharge or overdischarge to the outside of the battery.

Patent Document 1 has disclosed an assembled battery in which a plurality of batteries are placed in parallel and housed in a case providing a cooling wind path, characterized in that the cooling wind path and a gas discharge path for discharging gas discharged from the battery in a battery abnormality are formed in separate portions within the case.

PRIOR ART DOCUMENTS

Patent Documents

[Patent Document 1] Japanese Patent Laid-Open No. 2004-14421
[Patent Document 2] Japanese Patent Laid-Open No. 2006-318820
[Patent Document 3] Japanese Patent Laid-Open No. 2009-117264
[Patent Document 4] Japanese Patent Laid-Open No. 2000-021456

DISCLOSURE OF THE INVENTION

Problems to be Solved by the Invention

The abovementioned configuration, however, holds the batteries on a side wall portion providing the gas discharge path, so that the space surrounded by the side wall portion serves as a heat insulating layer to result in a structure which does not dissipate heat of the batteries easily. This causes variations in temperature between the batteries to shorten the battery life. To address this, it is contemplated to employ a method in which a heat conducting member which allows heat conduction between the batteries is provided as a separate component in order to suppress the variations in temperature. However, this method inevitably increases the number of parts to cause a higher cost. It is thus an object of the present invention to suppress variations in temperature between batteries while suppressing an increase in the number of parts.

Means for Solving the Problems

To solve the problem described above, the present invention provides (1) a power source apparatus having an assembled battery including a plurality of batteries of cylindrical shape arranged in a diameter direction of the battery within a case, including a holding member holding the plurality of batteries from the diameter direction and dividing internal space of the case into a cooling path in which a coolant flows and a gas discharge path in which gas discharged from the battery flows, wherein the holding member is a solid plate member conducting heat of the battery.

(2) In the configuration described in (1), the plurality of batteries include a first battery and a second battery located downstream of the first battery in the cooling path, and an area of the first battery that is held by the holding member is larger than that of the second battery, and an area of the first battery that is in contact with the coolant is smaller than that of the second battery. According to the configuration of (2), overcooling of the first battery located in the upstream of the cooling path is suppressed, and undercooling of the second battery located in the downstream of the cooling path is eliminated.

(3) In the configuration described in (1) or (2), the battery includes a gas discharge valve at one end portion in a longitudinal direction, and the holding member is located closer to the gas discharge valve than a central portion of the battery in the longitudinal direction. According to Arrhenius's law, the deterioration rate of the battery is increased as temperature is higher, so that the use of the configuration of (3) can ensure a sufficient cooling area.

(4) In the configuration described in (1) to (3), the holding member is formed of metal. According to the configuration of (4), the heat dissipating effect of the holding member is enhanced to allow effective suppression of variations in temperature between the batteries.

(5) In the configuration described in (1) to (4), the plurality of batteries are connected in parallel. It is possible to suppress greater variations in temperature resulting from the parallel connection of the batteries.

Effect of the Invention

According to the present invention, it is possible to suppress variations in temperature between the batteries while preventing an increase in the number of parts.

BEST MODE FOR CARRYING OUT THE INVENTION

Embodiment 1

Figure 1:
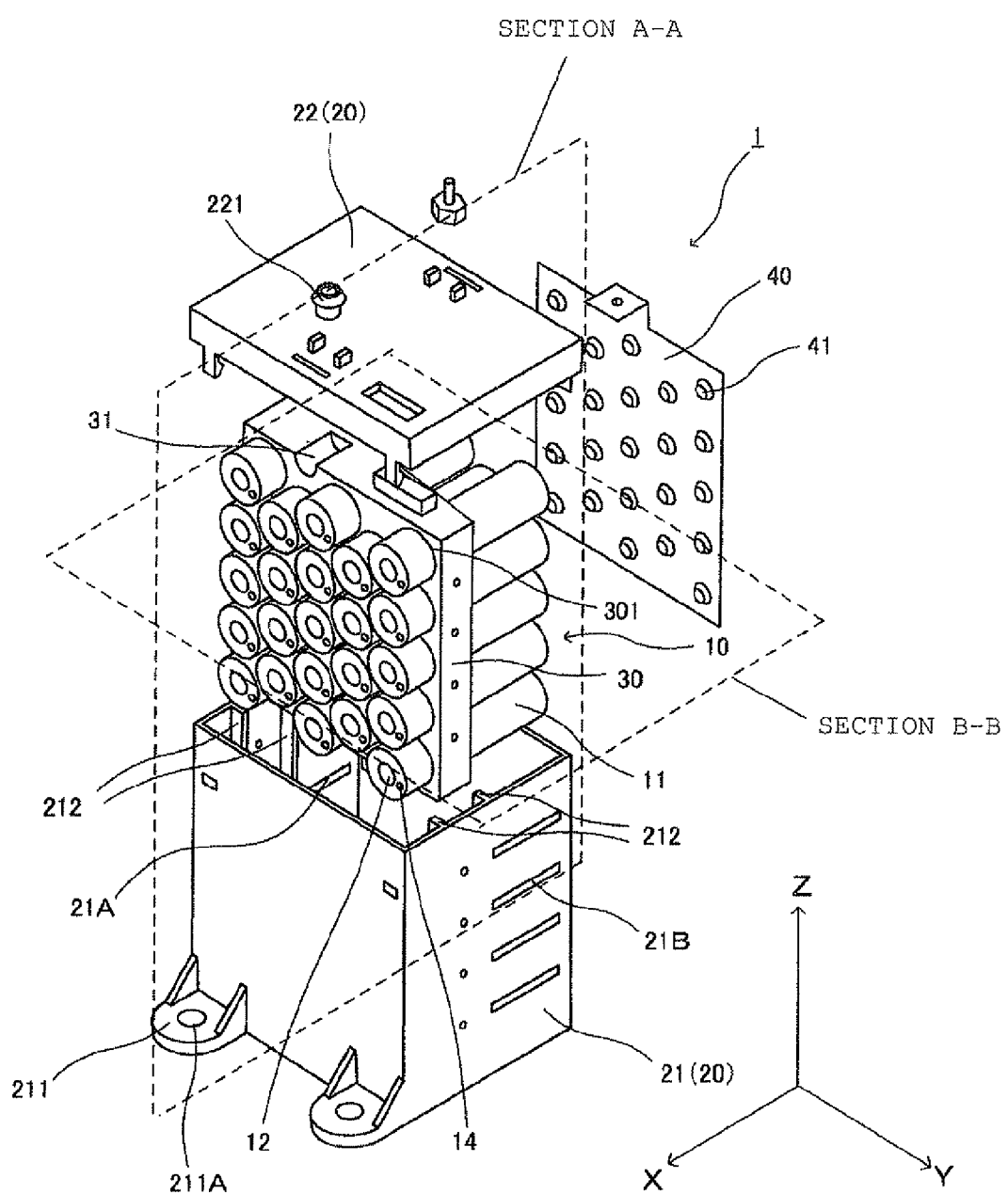
FIG. 1 is an exploded perspective view of a power source apparatus.
Figure 2:
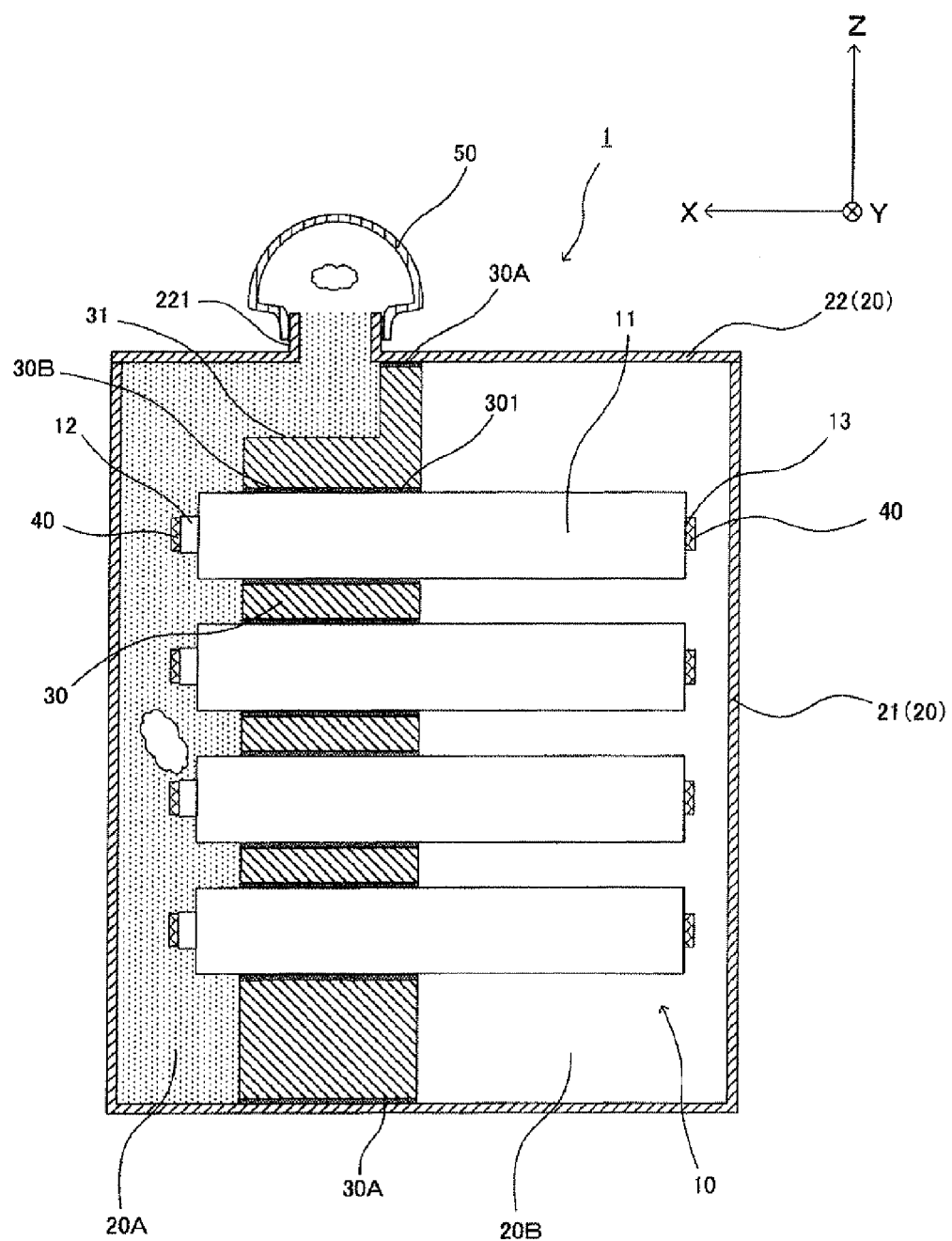
FIG. 2 is a section view of the power source apparatus taken along section A-A.
Figure 3:
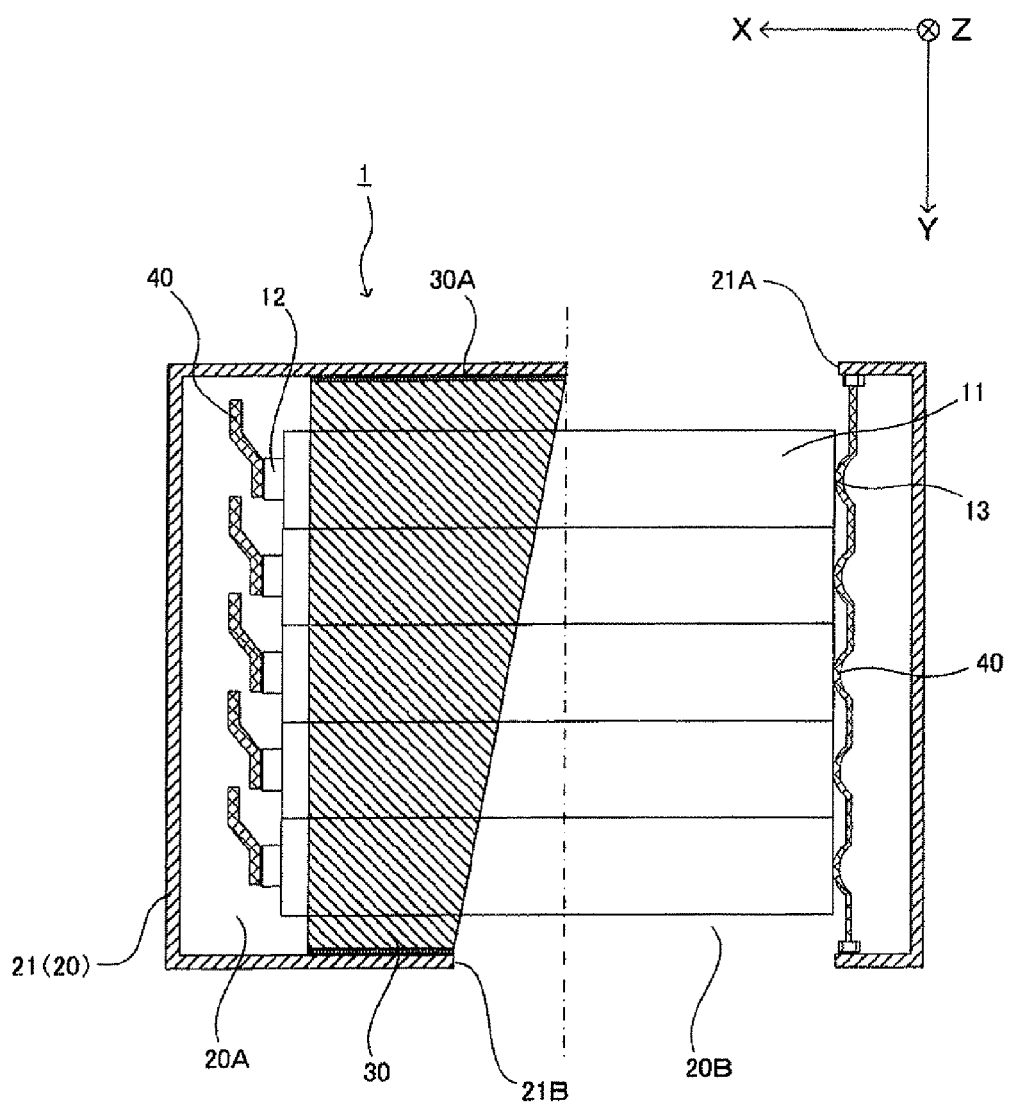
FIG. 3 is a section view of the power source apparatus taken along section B-B perspectively showing some batteries.

Referring to the drawings, a power source apparatus according to the present embodiment will be described. FIG. 1 is an exploded perspective view of the power source apparatus. FIG. 2 is a section view of the power source apparatus taken along section A-A. FIG. 3 is a section view of the power source apparatus taken along section B-B and perspectively shows some components. A power source apparatus 1 includes an assembled battery 10, a case 20, a holding member 30, and a bus bar 40. The assembled battery 10 includes a plurality of batteries 11. The battery 11 may be a secondary battery such as a lithium-ion battery and a nickel metal hydride battery. The battery 11 is formed in a cylindrical shape and includes a positive electrode terminal 12 and a gas discharge valve 14 at one end portion in a longitudinal direction and a negative electrode terminal 13 (see FIG. 2) at the other end portion in the longitudinal direction. The plurality of batteries 11 are arranged in a diameter direction of the batteries 11 such that their ends in the longitudinal direction are aligned.

The plurality of batteries 11 are connected in parallel through the bus bar 40. It should be noted that FIG. 1 shows only the bus bar 40 connected to the negative electrode terminals 13 and omits the bus bar connected to the positive electrode terminals 12. The bus bar 40 has a plurality of weld portions 41 to which the respective negative electrode terminals 13 of the batteries 11 are welded. The weld portion 41 is formed to be elastically deformable in an X-axis direction. This can accommodate the dimensional tolerance of each battery 11.

The holding member 30 includes a plurality of opening portions 301 for holding the associated batteries 11 to hold the outer faces of the batteries 11 in the diameter direction. The holding member 30 is a plate-shaped solid member and has a heat dissipating function of conducting the heat of the battery 11 having a higher temperature to the battery 11 having a lower temperature. This can suppress variations in temperature between the batteries 11. The holding member 30 is provided with both of the holding function of holding the batteries 11 and the heat dissipating function in this manner to reduce the number of parts, thereby achieving a lower cost. Specifically, since it is not necessary to provide an additional heat dissipating member for dissipating the heat of the battery 11, the cost can be reduced.

The holding member 30 may be formed of metal. The formation of the holding member 30 of metal can enhance the heat dissipating effect to suppress variations in temperature between the batteries 11 effectively. The metal may be aluminum, copper, or iron. Since aluminum has an extremely high heat conductivity, the holding member 30 can be formed of aluminum to suppress variations in temperature between the batteries 11 more effectively. Since aluminum is lightweight, the formation of the holding member 30 of aluminum can reduce the weight of the power source apparatus 1. Due to low cost of aluminum, the holding member 30 formed of aluminum can reduce the cost of the power source apparatus 1.

Figure 4:
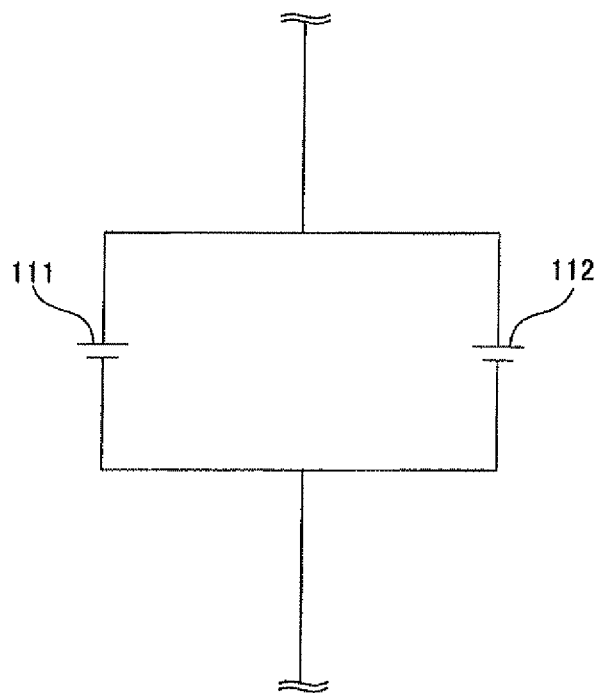
FIG. 4 is a circuit diagram of a parallel circuit.

When the batteries 11 are connected in parallel, a temperature difference between the batteries 11 tends to be larger than in the case where the batteries 11 are connected in serial. This will be described in detail with reference to FIG. 4. FIG. 4 is a circuit diagram in which a first battery 11 having an internal resistance R1 is connected in parallel to a second battery 112 having an internal resistance R2. It is assumed that the first battery 111 has a current value I1 and the second battery 112 has a current value I2. The internal resistance of the battery is reduced as the temperature of the battery is increased. For example when the temperature of the first battery 111 becomes higher than the temperature of the second battery 112, the internal resistance R1 of the first battery 111 becomes lower than the internal resistance R2 of the second battery 112. In contrast, the current value I1 of the first battery 111 becomes higher than the current value I2 of the second battery 112. Since the amount of generated heat is calculated by multiplying the square of the current value by the internal resistance, the amount of generated heat of the first battery 111 is larger than that of the second battery 112, and the temperature difference between the first battery 111 and the second battery 112 becomes even greater. According to the configuration of the present embodiment, it is possible to effectively suppress the greater variations in temperature resulting from the parallel connection of the batteries 11.

Returning to the description of the power source apparatus 1, the case 20 includes a case body 21 and a lid element 22. The case body 21 is formed in a bottomed box shape and includes a foot portion 211 at a lower end. The foot portion 211 has a fastening hole portion 211A for fixing the power source apparatus 1. The power source apparatus 1 may be fixed to a floor panel of a vehicle. A pair of insertion guide portions 212 for inserting the holding member 30 is formed on an inner face of the case 20. The insertion guide portion 212 extends in a vertical direction. The holding member 30 can be slid along the pair of insertion guide portions 212 to house the assembled battery 10 into the case body 21. The case body 21 has a coolant inlet port 21A extending in the longitudinal direction (X-axis direction) of the battery 11 and formed in one end face of the case body 21 in a Y-axis direction, and has a coolant discharge port 21B extending in the longitudinal direction of the battery 1 and formed in the other end face in the Y-axis direction. A plurality of coolant inlet port 21A and a plurality of coolant discharge port 21B are each formed at predetermined intervals in a height direction (Z-axis direction) of the power source apparatus 1. An intake duct, not shown, is connected to the coolant inlet port 21A. A blower is operated to introduce air serving as the coolant into the case 20 through the intake duct and the coolant inlet port 21A.

The holding member 30 has a gas guide portion 31 communicating with a exhaust gas duct connecting port 221 and formed in an upper end face of the holding member 30 (an end face in the Z-axis direction). Referring to FIG. 2, the holding member 30 includes a thin seal material 30A on a surface in contact with the case 20 and includes a thin seal material 30B on a surface in contact with the battery 11. The seal materials 30A and 30B may be formed of resin or rubber. The holding member 30 is in intimate contact with the inner face of the case 20 and the outer face of the battery 11 in this manner to allow the interior of the case 20 to be divided into two sections. The section where the positive electrode terminals 12 of the batteries 11 are located is defined as a gas discharge path 20A, whereas the section where the negative electrode terminals 13 of the batteries 11 are located is defined as a cooling path 20B. Since the seal materials 30A and 30B are formed thinly, the heat dissipating function of the holding member 30 is not compromised.

When the battery 11 is overcharged or overdischarged, an electrolyte solution is electrolyzed to produce gas. If more gas is produced, the internal pressure of the battery 11 reaches the operation pressure of the gas discharge valve 14 to discharge the gas to the gas discharge path 20A through the gas discharge valve 14. The gas discharged to the gas discharge path 20A is moved upward in the gas discharge path 20A and discharged to a exhaust-gas duct 50 through the gas guide portion 31. The gas discharged to the exhaust-gas duct 50 is discharged to the outside of the vehicle. It should be noted that the exhaust-gas duct 50 is omitted in FIG. 1.

Referring to FIG. 3, the coolant inlet port 21A has dimensions in the longitudinal direction of the battery 11 that are set to be smaller than those of the coolant discharge port 21B, and the end portion of the holding member 30 that faces the cooling path 20B is formed in a tapered shape. Specifically, the areas of the batteries 11 held by the holding member 30 are smaller and the areas of the batteries 11 in contact with the coolant are larger from the coolant inlet port 21A toward the coolant discharge port 21B. In other words, in the battery 11 (first battery) located in the upstream of the cooling path 20B, the area held by the holding member 30 is larger and the area in contact with the coolant is smaller than in the battery 11 (second battery) located in the downstream of the cooling path 20B.

The coolant flowing in through the coolant inlet port 21A has a higher temperature and a lower cooling capability as it approaches the coolant discharge port 21B. Thus, a larger area of the battery 11 located in the downstream of the coolant path 20B is brought into contact with the coolant to suppress variations in the cooling efficiency. As a result, it is possible to suppress overcooling of the batteries 11 located in the region closer to the coolant inlet port 21A and to eliminate shortage of cooling of the batteries 11 located in the region closer to the coolant discharge port 21B.

A dashed-dotted line shown in FIG. 3 indicates the central position of the battery 11 in the longitudinal direction. The holding member 30 is preferably placed closer to the gas discharge valve 14 than the central position. According to Arrhenius's law, the deterioration rate of the battery 11 is increased as temperature is higher, so that the deterioration of the battery 11 can be suppressed by ensuring a sufficient cooling area.

Modification 1

Figure 5:
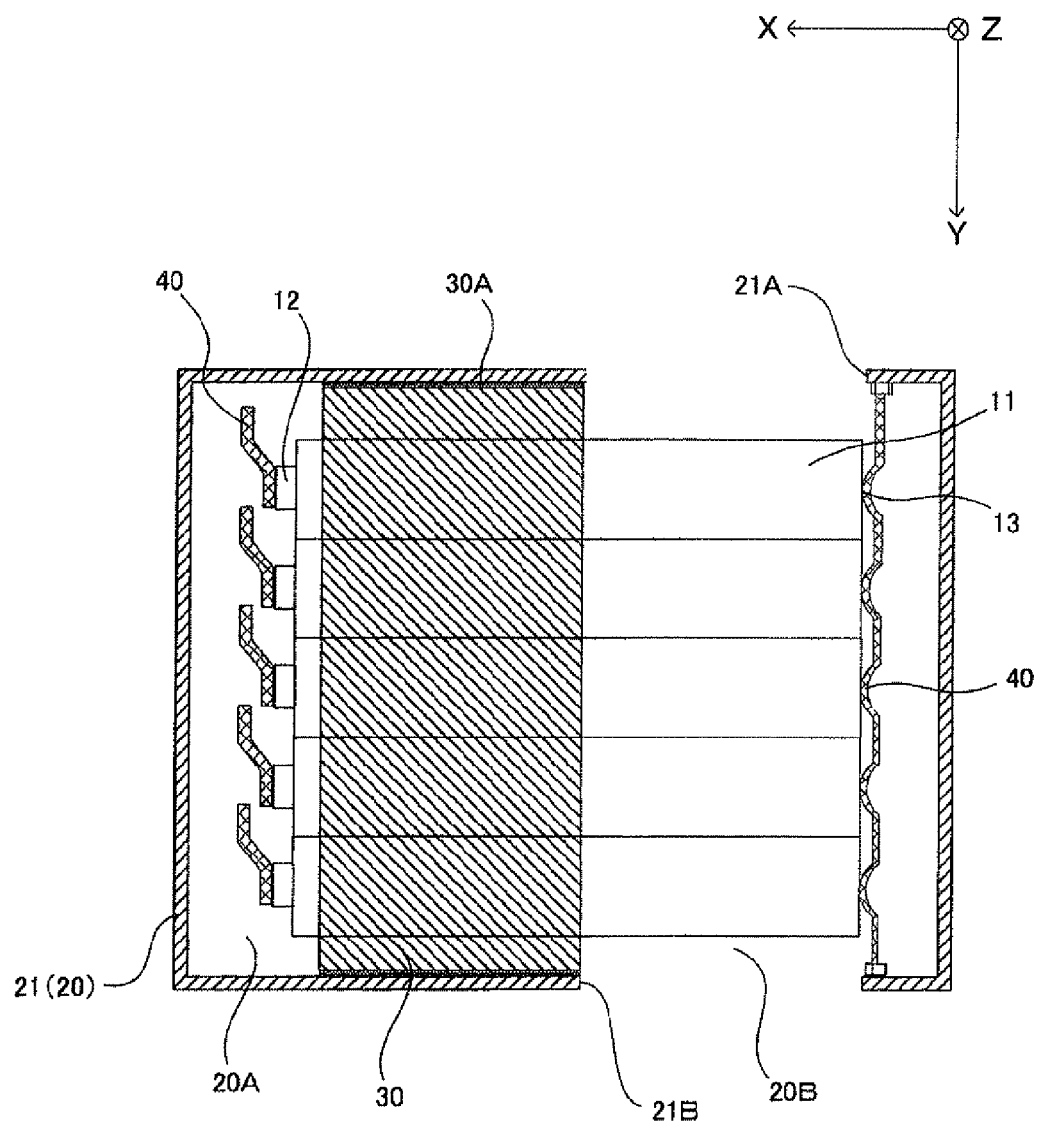
FIG. 5 is a section view of a power source apparatus according to Modification 1.
Figure 6:
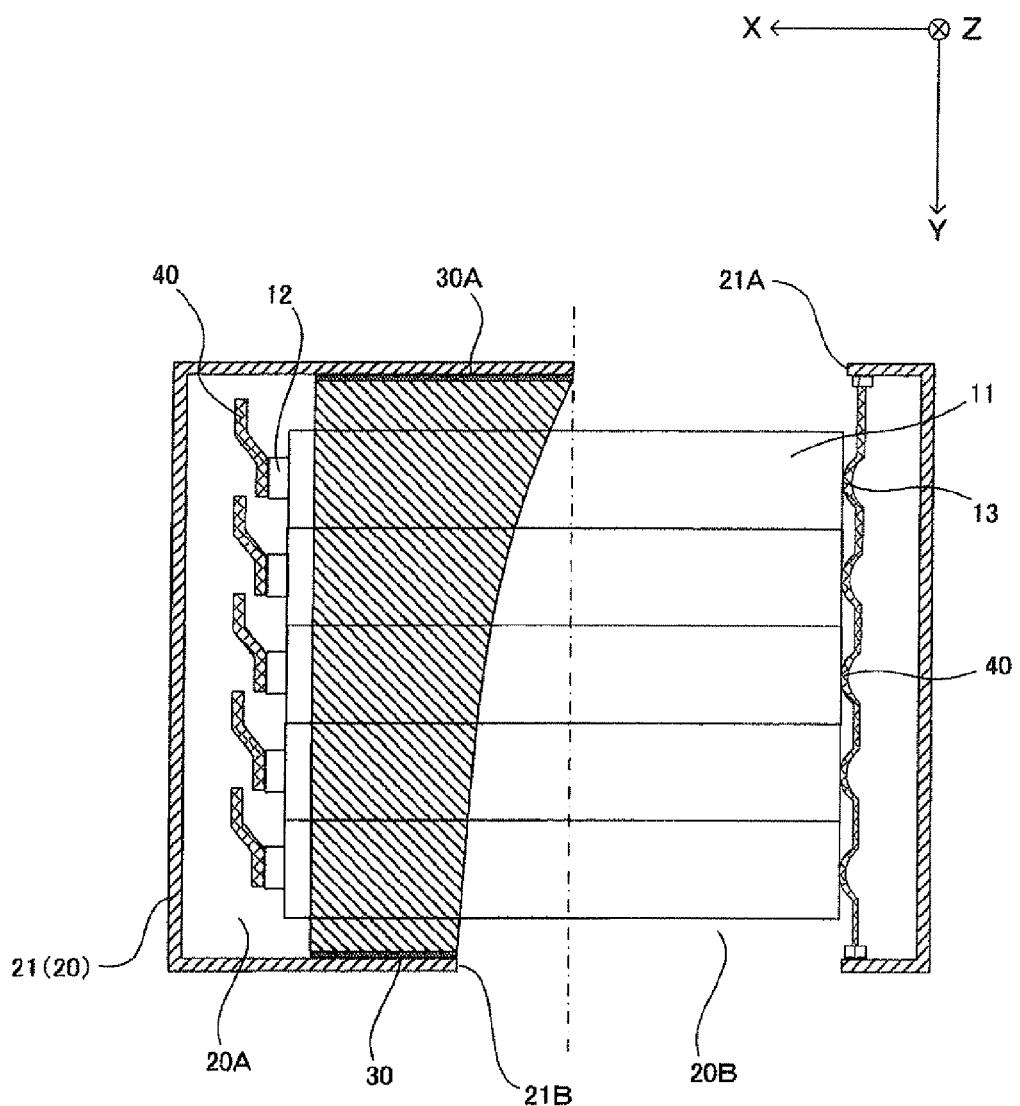
FIG. 6 is a section view of another power source apparatus according to Modification 1.

While the end portion of the holding member 30 that faces the cooling path 20B is formed in the tapered shape in the embodiment described above, the present invention is not limited thereto, and another configuration can be employed depending on cooling conditions of the power source apparatus. An example of the other configuration is shown in FIG. 5 and FIG. 6. Referring to FIG. 5, when a heat source is present close to a battery 11 located near a coolant inlet port 21A, the battery 11 is not cooled easily. In this case, variations in temperature between the batteries 11 may be suppressed by forming the end portion of a holding member 30 that faces a cooling path 20B in a shape extending in a Y-axis direction. Referring to FIG. 6, the end portion of a holding member 30 that faces a cooing path 20B may be formed along a curved line.

Modification 2

While the gas discharge valve 14 is formed on the side of the positive electrode terminal 12 of the battery 11 in the embodiment described above, the present invention is not limited thereto, and the gas discharge valve 14 may be formed on the side of the negative electrode terminal 13 of the battery 11. In this case, in the configuration shown in FIG. 3, the battery 11 may be installed in an opposite orientation to place the negative electrode terminal 13 on the side of the gas discharge path 20A and the positive electrode terminal 12 on the side of the cooling path 20B. This configuration can also achieve similar effects to those in the embodiment described above.

Modification 3

Figure 7:
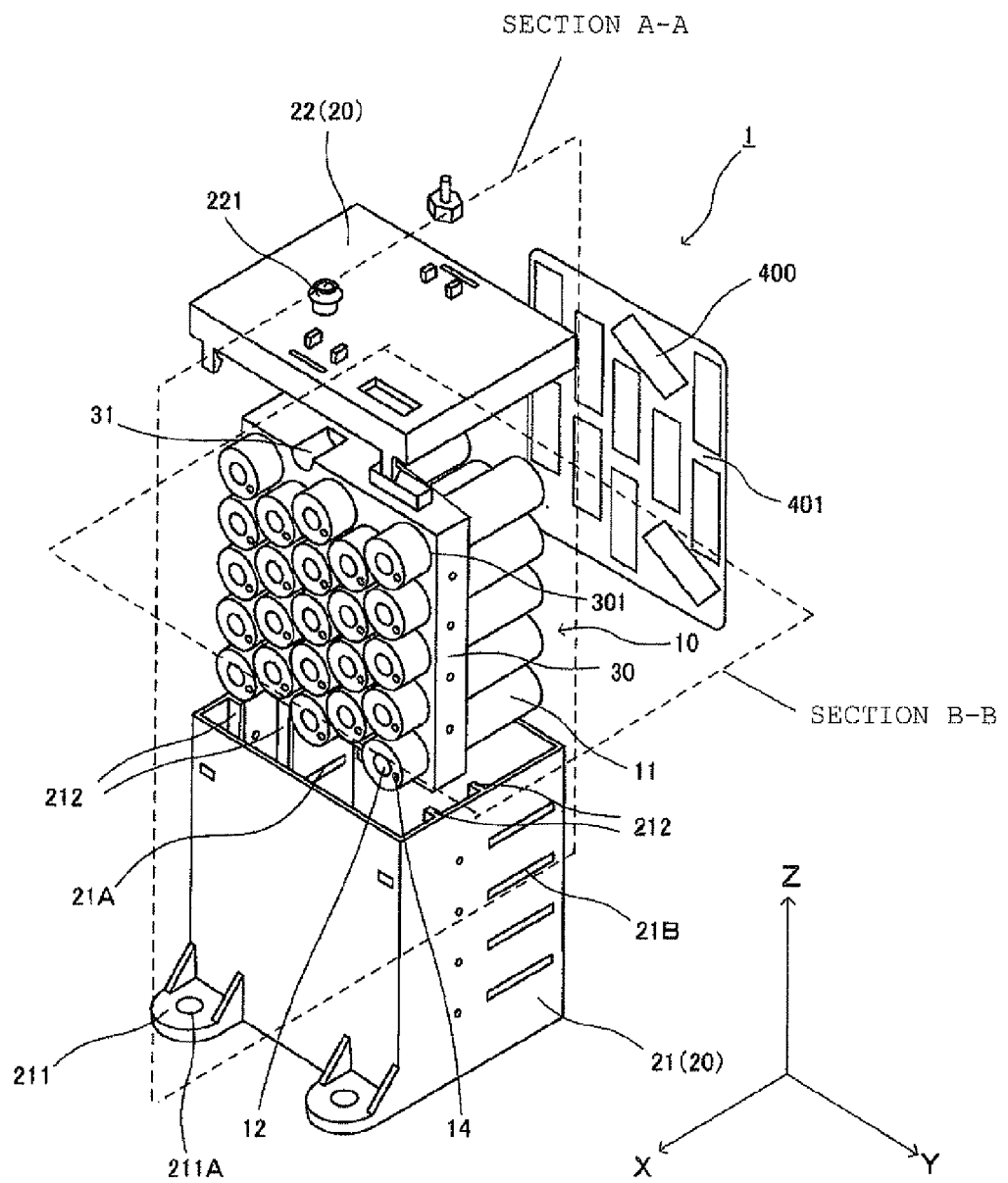
FIG. 7 is an exploded perspective view of a power source apparatus according to Modification 3.

While the batteries 11 are connected in parallel in the embodiment described above, the present invention is not limited thereto, and batteries 11 may be connected in series as shown in FIG. 7. FIG. 7 is an exploded perspective view showing a power source apparatus according to Modification 3 and corresponding to FIG. 1. Components identical to those in the embodiment described above are designated with the same reference numerals.

A plurality of batteries 11 are arranged such that their positive electrode terminals 12 and negative electrode terminals 13 are placed alternately. Ones of the alternate batteries 11 have gas discharge valves 14 formed on the side of positive electrode terminals 12, whereas the other batteries 11 have gas discharge valves 14 formed on the side of the negative electrode terminals 13. This allows the gas discharge valves 14 of all the batteries 11 to be placed on the side facing a gas discharge path 20A. A bus bar 400 is formed in a rectangular shape and is held by a bus bar holding member 401. The bus bar holding member 401 is formed of insulating resin, and the insulating resin is interposed between the adjacent bus bars 400. This suppresses a short circuit between the batteries 11. The bus bar 400 connects the positive electrode terminal 12 and the negative electrode terminal 13 of the adjacent batteries 11. The connection may be performed by welding. The configuration according to the present modification can also effectively suppress variations in temperature between the batteries 11.

The invention claimed is:

1. A power source apparatus having a plurality of batteries of cylindrical shape arranged in a diameter direction of each battery within a case, comprising:
    a holding member holding the plurality of batteries from the diameter direction, including a plurality of opening portions each covering a part of an outer circumference surface of each battery, and dividing internal space of the case into a cooling path in which only a coolant, out of the coolant and gas discharged from a gas discharge valve of each battery, flows and a gas discharge path in which only the gas out of the coolant and the gas flows,
    wherein the holding member is a solid plate member conducting heat of each battery and the gas discharge valve is located in the gas discharge path,
    the plurality of batteries include a first battery and a second battery located downstream of the first battery in the cooling path,
    the plurality of opening portions include a first opening portion holding the first battery and a second opening portion holding the second battery,
    an area of the first battery that is held by the holding member is larger than that of the second battery, and an area of the first battery that is in contact with the coolant is smaller than that of the second battery, and
    a maximum length of the first opening portion in a longitudinal direction of the first battery is longer than a maximum length of the second opening portion in a longitudinal direction of the second battery.

2. The power source apparatus according to claim 1, wherein the gas discharge valve is located at one end portion of each battery in a longitudinal direction thereof, and
    the holding member is located closer to the gas discharge valve than a central portion of each battery in the longitudinal direction.

3. The power source apparatus according to claim 1, wherein the holding member is formed of metal.

4. The power source apparatus according to claim 1, wherein the plurality of batteries are connected in parallel.

5. The power source apparatus according to claim 1, wherein the case comprises a coolant inlet port configured to introduce the coolant into the cooling path and a coolant discharge port configured to discharge the coolant from the cooling path.

6. The power source apparatus according to claim 1, wherein the holding member is in intimate contact with the entire inner surface of the case and the outer surface of each battery to divide the internal space of the case into the cooling path and the gas discharge path.

* * * * *